(12) United States Patent
Frare

(10) Patent No.: US 7,645,041 B2
(45) Date of Patent: Jan. 12, 2010

(54) SOUND LIGHTING SPECTACLES

(76) Inventor: Silvano Frare, Silvano Frare presso Tecnostyle SRL Via Erizzo, sn-Loc. Zecchei, Valdobbiadene (IT) 31049

( * ) Notice: Subject to any disclaimer, the term of this patent is extended or adjusted under 35 U.S.C. 154(b) by 103 days.

(21) Appl. No.: 11/662,264

(22) PCT Filed: Sep. 16, 2005

(86) PCT No.: PCT/IB2005/002955

§ 371 (c)(1),
(2), (4) Date: Mar. 9, 2007

(87) PCT Pub. No.: WO2006/033008

PCT Pub. Date: Mar. 30, 2006

(65) Prior Publication Data

US 2008/0002141 A1 Jan. 3, 2008

(30) Foreign Application Priority Data

Sep. 23, 2004 (IT) .......................... BL2004U0010

(51) Int. Cl.
*G02C 1/00* (2006.01)

(52) U.S. Cl. ........................................ 351/158; 351/51

(58) Field of Classification Search .................... 351/41, 351/158, 51, 52
See application file for complete search history.

(56) References Cited

U.S. PATENT DOCUMENTS

| 4,254,451 A | * | 3/1981 | Cochran, Jr. | ................. 362/103 |
| 4,822,160 A | * | 4/1989 | Tsai | ............................ 351/158 |
| 4,904,078 A | * | 2/1990 | Gorike | ....................... 351/158 |

* cited by examiner

*Primary Examiner*—Huy K Mai
(74) *Attorney, Agent, or Firm*—Novak Druce + Quigg LLP

(57) ABSTRACT

The present invention deals with a new and additional aesthetical and customized decorative function to be given to the spectacles, in particular to the kind of spectacles used by young people and in particular entertainment and socialization places. Fundamental innovative feature of the invention is that of providing the spectacles with a light device D to be applied at sight on any of their external frame A, comprising a microphone (10) for the perception of the intensity of the sounds and noises, in order to reproduce and represent them visually in a light form, which is chromatically and proportionally intense, by means of a proper micro-processor (40), that transforms the sound intensity into lighting power of the display D by means of its printed circuit (30), said microprocessor being linked to a battery (50) as well as to a on/off switch (20).

11 Claims, 1 Drawing Sheet

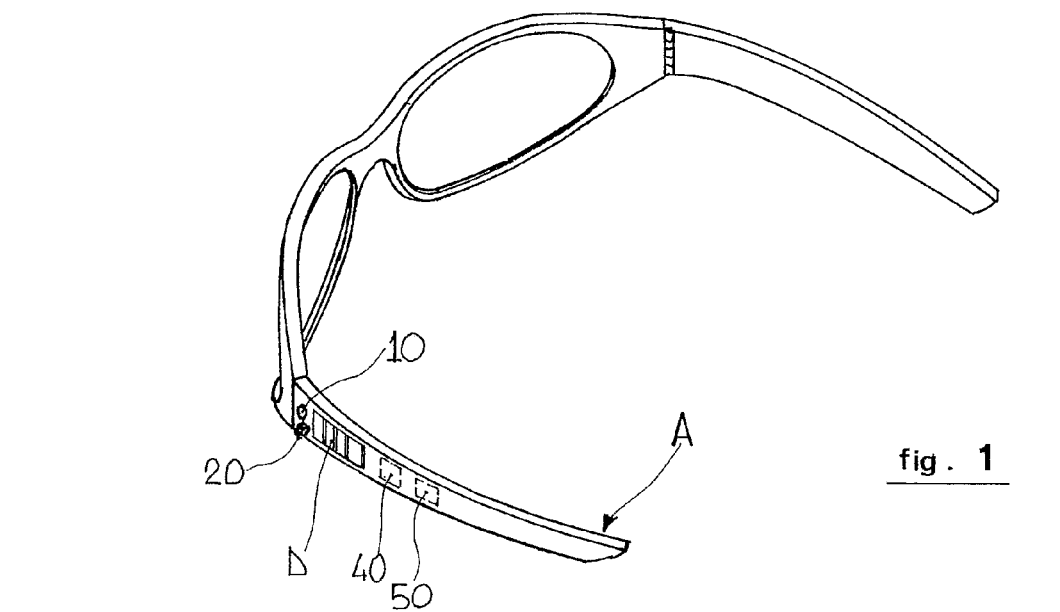
fig. 1
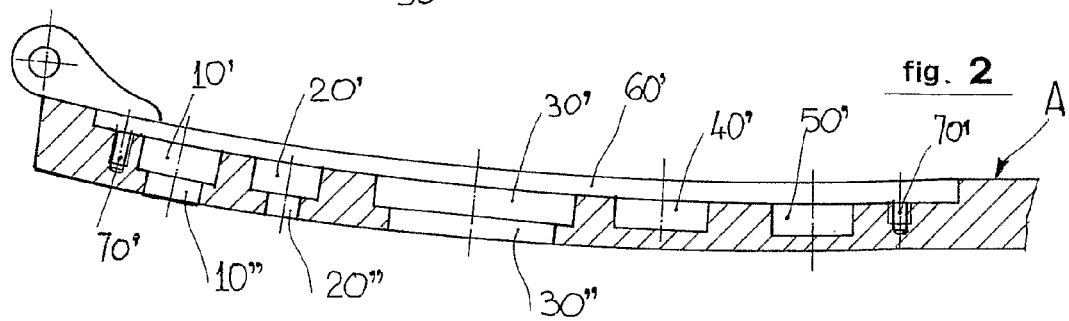
fig. 2
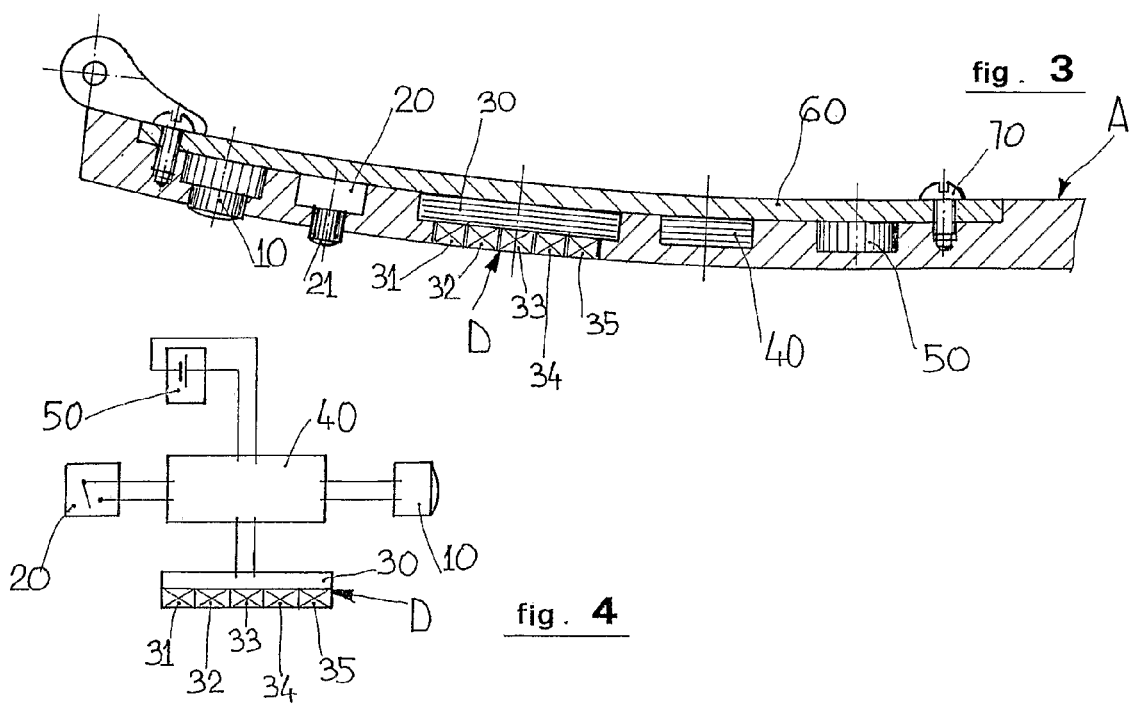
fig. 3
fig. 4

SOUND LIGHTING SPECTACLES

The present innovation deals with a new and additional aesthetical and customized decorative function to be given to the spectacles, in particular to the kind of spectacles used by young people and in particular entertainment and socialisation places.

Fundamental innovative feature of the invention is that of providing the spectacles with a light device to be applied at sight on the outer surface of one part of its frame, with a microphone for the reception of the intensity of the sounds and noises, in order to be able to reproduce and visually represent them in a chromatically and proportionally intense light form by means of a proper micro-processor that transforms the sound intensity into light power and transmits them to a set of light sources of a printed circuit embedded in the same part of the spectacles frame.

With the passing of time, the spectacles have taken a greater and greater aesthetical and personalizing feature in addition to and often overlapping their natural and starting protective and/or sight corrective function.

The same spectacles have often become an ideal support to receive and transmit sound signals, in particular radiophonic frequency, but also to support applications of mobile telephony, as, for instance, described in the patent applications DE19959493 and EP0840465.

Then, the spectacles frame has sometimes been used as support for on/off-lighting devices, as, for instance, described in the patent JP2002228992.

At the present state of the art no spectacles seem to be able, in addition to their optical qualities for sight correcting and protecting and to their above mentioned ability of supporting sound reception devices or light emission devices, to add also the function of combining properly said characteristic of being a support for light devices, which are, in particular, linked to the sound reception, to achieve a particular light effect, which is so aesthetically visible and linked to the sound source or sonority.

Object of what is issue of the present innovation is right that of making possible the use of a spectacles frame, which is able, furthermore, to receive the surrounding sound or the sound of a fixed source and to make it visible in form of a light signal, linking the sense of the hearing to the sense of the sight of the person, who stands near the wearer of the spectacles.

Within the scope of this object, another important object of the present innovation is that of giving the possibility of grading the light intensity of its signal and its chromatic aspect in direct relation to the intensity and/or tonality of the noise or music received.

Other clear object of the present innovation is that of giving the possibility of using the ability of a spectacles frame of receiving a noise or a sound and transforming it into a light signal having an intensity and a colouring proportionally variable in order to achieve a particular and innovative aesthetical effect and the customization of the same spectacles frame.

The proposed task and the other mentioned objects are, as a matter of fact, perfectly achieved with the accomplishment of a spectacles frame, which is provided with a light device communicating with a microphone or sound sensor and with a proper micro-processor, which microphone receives the intensity of the sound or noise and its tonality in order to transmit them to a processor that acknowledges them as a variation of the intensity of the current to be transmitted to the light device, which light device switches on with an intensity and colouring that are proportional to the intensity and to the tone of the noise received by the microphone.

A better understanding of the innovation and its correspondence to the proposed objects is better emphasized by the description of one of its embodiment, that is only indicative and not limitative, here below illustrated also with the help of nr. 4 schematic drawings represented in the appended table and in which:

FIG. 1 illustrates a perspective view of a casual shape of spectacle frame, having an arm, on which the application of the device at issue is represented;

FIG. 2 illustrates a longitudinal and partial section of the left arm of the spectacles of FIG. 1, said arm being properly shaped for the application and the housing of the elements compounding the device at issue;

FIG. 3 illustrates the same longitudinal section of the arm of FIG. 2, on which arm the different components of the device at issue have been applied;

FIG. 4 illustrates a view of a simple scheme of the electrical components represented in FIG. 3 and of the consequent connections that enable its functioning.

In all drawings the same details are represented or understood as being represented with the same reference number.

According to the embodiment proposed in the different figures of the attached table, an arm A of spectacles is properly shaped so as to support and house a printed circuit 30 that connects a microphone 10 for the reception of the sound, a switch 20 for turning on and turning off the device at issue, a printed circuit 30, which is linked to a set of LED or other light sources 31-32-33-etc. of a display D, a micro-processor 40 that is able to receive and transform the intensity of the sound into intensity of the current, with which a battery 50 supplies the same processor 40 to electrically feed the different LED 31-32-33-etc. of the display D.

More in detail, a switch 20 is placed in a proper hollow 20' of the arm A, presenting its starting lever or button, preferentially turned outwards with respect to the same arm A, in order to be more easily operated.

Said switch 20 allows the turning on and the turning off of the micro-processor 40, which, on its turn, is linked both to the microphone 10 and to the plate of the printed circuit 30, as well as to the feeding battery 50.

Of course the microphone 10 is housed in its seat 10' of the arm A, so as the switch 20 is housed in its seat 20', the plate of the printed circuit 30 and its light sources 31-32-33 etc. are housed in the respective hole 30', while the microprocessor 40 and the battery 50 are arranged in corresponding holes 40' and 50' of the same arm A, each components being electrically linked according to the scheme of FIG. 4.

With particular reference to the FIGS. 2 and 3, it is clear that the holes 10'-20'-30' and their narrow openings 10"-20" and 30" are properly shaped so as to make project the head of the microphone 10, the lever or button 21 of the switch 20 and the surface of the head of the display D respectively, while the holes 40' and 50' are accomplished as blind in order to contain respectively the micro-processor 40 and the battery 50, all said holes being accomplished deeply with respect to a seat or decrease 60' of the inner surface of the arm A to house the plate or cover 60, which is, on its turn, fixed to the arm A, for example, by means of screws 70 to be fixed into blind holes 70', in order to hermetically seal and block the above mentioned different components and their electrical connections.

Operating the switch 20, the electronic circuit, which allows the micro-processor 40 to be fed by the battery 50 and to receive from the microphone 10 the intensity and the tonality of the sound received by that from the surrounding environment or from a specific sound source, is closed.

According to a well-known technique, the micro-processor 40 is able to receive the intensity of the sound or noise, in relation to fixed parameters and to transform it into intensity of electric current to be transmitted to the LED 31-32-33 etc. of the printed circuit 30.

The same single LED or light sources 31-32-33 etc. are set in order to work only upon achievement of a fixed intensity of current, so that their working won't occur simultaneously but gradually with the increase of the intensity of the sound.

By way of example only, there is the possibility that upon increase of the intensity of the sound, a gradual lighting of the LED 31, and then also of the LED 32, and then also of the LED 33 etc. occurs, in order to have thus a succession of switching on and off of the same LED 31-32-33 etc. at any increase or decrease of the intensity of the sound.

Spectacles are thus accomplished that add to their aesthetical form of new or traditional frame also an aesthetical effect, which is completely new, given by the variable lighting of its particular display D comprising the set of LED 31-32-33 etc., which hit the senses of the hearing and sight of the people who can see the spectacles working on the person wearing them.

The micro-processor 40, still according one of its well-known functions, is able to transmit to the LED 31-32-33 etc. a different degree of colouring, for example in relation to fixed tonalities of the sound or noise source after proper filtering of the sound or music coming from the microphone 10.

The possibility of a further chromatic variation is so added to the aesthetical function of the spectacles at issue, the mentioned objects being perfectly achieved.

As already mentioned in the FIGS. 1 to 3, a particularly advantageous use of an arm A of spectacles is proposed for the accomplishment of the device till now described and summarized in the scheme of FIG. 4, the different positions of the components of the device at issue being represented in particular, with a succession of the microphone 10, of the button 21 of the switch 20, of the display D comprising a set of LED 31-32-33 etc., of the micro-processor 40 and of the battery 50, each component being housed in the respective seats 10' -20' -30' -40' - and 50'.

Of course, the different components can be arranged differently on the arm A, even if, in relation to the size of the same arm A, said components have to be sufficiently miniaturized, being, anyway, already available on the market separately, also in relation to the power of the light supply which is desired to be provided to the light sources 31-32-33 etc., the present innovation consists in that it reaches the wished effect that can be accomplished assembling certain components on a spectacles frame, for example on an arm.

It is, of course, possible to provide for a complete or partial application and extension of the device till now described, for example, to the front piece of spectacles, as well as it is possible to provide, for example, for the application of the display D, of the microphone 10 and of the battery 50, for instance, on the bridge of the front piece of spectacles frame to connect the device itself to the micro-processor 40 and to the other components already mentioned by means of contacts that go through the hinges of the arm, said components being able to be placed in one or both spectacles arms, or besides that it is also possible to provide for the presence of a proper connection that allows the linking to a battery external to the spectacles frame or of a connector that allows the connection to a loader for batteries for the loading of the latter.

It is then possible to provide for the connection of the microphone 10, for example, with an ordinary little portable radio or other well-known portable device for the reproduction of music, as well as to provide for the contemporary application of the described device with one of the connecting devices for the mobile telephony, already accomplished by means of spectacles.

It is possible that in the outer side of the arm A or in the other involved part of the frame a transparent protection is provided, in order to allow the view of the display, as well as it is possible to provide the button with an external rubbery covering. That is to protect the components from the humidity, scratches or any other external agents.

It is also possible to provide for the elimination of the closing plate 60 and for its replacement with a proper sealant that assures the stable positioning of the described components and their proper insulation, as well as it is possible to accomplish arms A, which are previously printed with the different components above described and their circuits for the electric feeding already incorporated and embedded, as well as it is possible to provide for an extension of the printed circuit along the whole opening 60, in order to reach and connect all the described components.

These and other similar modifications or adjustments are understood as belonging to the originality of the innovation to be protected.

The invention claimed is:

1. Sound lighting spectacles, comprising a spectacles frame provided with housing holes to contain a light device including a plurality of LED's (light emitting diodes) linked to a micro-processor and to a microphone for the reception of sounds and noises to transform said noises and sounds into a corresponding current intensity, that, going to a printed circuit supplies a proportional intensity of current to the plurality of LEDs so as to emit a corresponding light and colour, determining the combination of the senses of the hearing and of the sight in the person that sees the spectacles worn by a third person and operated by the latter.

2. Sound lighting spectacles according to claim 1, wherein on the spectacles frame there are arranged holes housing and containing respectively the microphone, a switch, the printed circuit and the LEDs, the micro-processor and a battery, the above-mentioned components being contained by a plate or cover.

3. Sound lighting spectacles according to claim 2, wherein the holes are provided with a respective reduced opening on the outer side of the spectacles frame, to house respectively a head of the microphone, a lever or button of the switch and a surface at sight of the LED of the light device, that in this way get in contact with the environment external to the same spectacles frame.

4. Sound lighting spectacles according to claim 2, wherein the microphone, the switch, the light device, the micro-processor and the battery are electrically connected to each other by means of the printed circuit and of the respective connecting ends, connections being placed before closing the same mentioned components with the cover.

5. Sound lighting spectacles according to claim 2, further comprising a connector for the connection to a feeder of an electric network for the reloading of the battery.

6. Sound lighting spectacles according to claim 2, wherein the plate or cover is internal to the spectacles frame.

7. Sound lighting spectacles according to claim 1, wherein an electric feeding is assured by means of a connection to a battery external to the spectacles frame.

8. Sound lighting spectacles according to claim 1, wherein all the components and the connections of the sound lighting of the spectacles are closed and contained inside an arm A.

9. Sound lighting spectacles according to claim 8, further comprising a protection, made in a transparent material, of the arm A or of at least part of the spectacles frame.

10. Sound lighting spectacles according to claim 8, wherein in the external part of the arm A is applied a protection made of rubbery material.

11. Sound lighting spectacles comprising a spectacles frame provided with housing holes to contain a light device including a plurality of LED's (light emitting diodes) linked to a micro-processor and to a microphone for the reception of sounds and noises to transform said noises and sounds into a corresponding current intensity, that, going to a printed circuit supplies a proportional intensity of current to the plurality of LEDs so as to emit a corresponding light and colour, determining the combination of the senses of the hearing and of the sight in the person that sees the spectacles worn by a third person and operated by the latter;

wherein the microphone is combined with or replaced by a direct sound source, as a little radio.

* * * * *